United States Patent
Schnurrbusch et al.

[11] 3,856,533
[45] Dec. 24, 1974

[54] SURFACE POLISHES BASED ON ORGANOPOLYSILOXANES AND WAX

[75] Inventors: Karl Schnurrbusch, Leverkusen-Steinbuechel; Peter Preiss, Wuppertal, both of Germany

[73] Assignee: Bayer Aktiengesellschaft, Leverkusen, Germany

[22] Filed: Dec. 28, 1973

[21] Appl. No.: 429,310

[30] Foreign Application Priority Data
Jan. 4, 1973   Germany............................ 2300245

[52] U.S. Cl..................................... 106/10, 260/28
[51] Int. Cl............................ C08h 9/06, C09g 1/08
[58] Field of Search........................... 106/10; 260/28

[56] References Cited
UNITED STATES PATENTS

| | | | |
|---|---|---|---|
| 2,626,870 | 1/1953 | Cook et al. | 260/28 |
| 2,807,554 | 9/1957 | Serey et al. | 260/28 X |
| 3,071,479 | 1/1963 | Fulenwider | 106/10 |
| 3,393,078 | 7/1968 | Lockhart et al. | 106/10 X |

*Primary Examiner*—Lewis T. Jacobs
*Attorney, Agent, or Firm*—Burgess, Dinklage & Sprung

[57] ABSTRACT

A conventional polish comprising an organopolysiloxane oil and wax is improved, according to the invention, by adding from 2 to 40 per cent by weight of an organosiloxane of the general formula

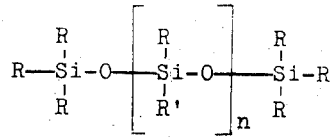

wherein
$n =$ zero or an integer from 1 to 12,
$R' = R$ or $-OSiR_3$ and
each R is, independently of the others, an alkyl, alkenyl or monocyclic aryl radical with up to 18 carbon atoms, but chosen with the proviso that the numerical ratio of the sum of all carbon atoms to the sum of all silicon atoms is from 4 : 1 to 20 : 1.

By this additive, a polish of higher resistance to detergents, better gloss retention and more resistance to finger-marking is obtained.

5 Claims, No Drawings

SURFACE POLISHES BASED ON ORGANOPOLYSILOXANES AND WAX

The invention relates to an improvement in surface polishes containing wax.

In such polishes, for surfaces of various kinds, it has for a long time been found of value to add polydimethylsiloxane oils; these oils act as lubricants for the wax particles and hence facilitate polishing work and subsequent cleaning. Furthermore, they assist homogeneous distribution and produce a deeper gloss and a hydrophobic effect (compare "Seifen, Ole, Fette, Wachse" 95 (1969) 367 and 581 and W. Noll "Chemie und Technologie der Silicone" ("Chemistry and Technology of the Silicones"), Weinheim 1968, page 522).

However, these advantages are only displayed unrestricted in the case of surfaces which are not usually cleaned with detergents, that is to say, for example, in the case of furniture and similar articles made of wood. When treating surfaces of glass, stone, plastic, metal or paint, an after-treatment with a suitable polish must be carried out after each cleaning with detergents. This has lead, for example, in the case of car body polishing, to the development of so-called car-wash gloss preservers, which give the lacquer surface a glossy and hydrophobic coating after it has been washed with detergent solutions.

In order to bring about this polished condition, or to renew it, different agents, which usually contain petrol, are required, however, for example a hard wax combination or a polishing composition containing abrasives (compare "ADAC-Motorwelt," May 1968, page 47). The wax film thus obtained, however, loses its protective action soon, depending on the weather to which it is exposed and above all because of the emulsifying action of washing agents containing detergents.

Attempts have been made to extend the durability by using aminoorganopolysiloxanes instead of the conventional polydimethylsiloxanes (U.S.A. Pat. Nos. 2,738,357; 3,508,933; 3,576,779; and British Pat. Nos. 1,154,766 and 1,237,080. Such amino compounds are usually prepared by reacting dimethylpolysiloxanes containing silanol groups with organosilanes containing amino groups. However, when applied as a solution or emulsion, they do not give as brilliant a gloss as the previously used polydimethylsiloxanes and for this reason, and also because of better polishability, polydimethylsiloxane oils have also been added to the mixture. This, however, caused the resistance to detergents once again to suffer considerably. It was possible to counteract this largely by combination with an acid wax (on this topic, compare G. Koerner "Haus der Technik, Vortragsveröffentlichungen," issue 242 (1970), page 20; "Chemical Week," January 1970, page 72). However, such combinations tend to smear easily in use, so that the film applied has unsatisfactory resistance to finger-marking.

In addition to the amino compounds mentioned, silicon compounds which contain hydroxyl groups or form hydroxyl groups, and other metal compounds, for example organopolysiloxane resins, organohydrogenosilicon compounds, silicic acid esters, alkyl titanates or alkyl zirconates, in combination with organopolysiloxanes, are also known to adhere well to lacquer surfaces. However, because of inadequate polishability and lack of gloss of these systems, the compounds mentioned above are unsuitable both when used by themselves and when used as mixtures with waxes.

It has now been found that independently of the nature of the wax and of the organopolysiloxane system chosen, polishes which have excellent resistance to detergents, can be polished easily, and give good resistance to finger-marking and good gloss retention, are obtained if the organopolysiloxane-wax combination is compounded with a quantity, amounting to between 2 and 40 per cent by weight of this combination, of an organosiloxane of the formula

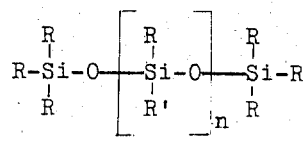

wherein
$n$ = zero or one of the integers from 1 to 12,
$R'$ = R or $-OSiR_3$ and
each R is, independently of the others, an alkyl, alkenyl or monocyclic aryl radical with up to 18 carbon atoms, but chosen with the proviso that the numerical ratio of the sum of all carbon atoms to the sum of all silicon atoms is 4 to 20, preferably 4 to 8.

These compounds are compatible with waxes and in addition effect solubilisation between the wax and the organopolysiloxane so that a largely homogeneous protective film is formed, which anchors to the substrate by means of the functional groups of one of the organopolysiloxane combinations described above. This leads to excellent resistance to detergents and to weathering, while retaining ease of polishing.

In the examples which follow "parts" denote parts by weight and percent denotes per cent by weight.

EXAMPLE 1

A solution of a polish for fairly old lacquers is obtained from 91.2 parts of petrol of boiling range 130°–220°C, 2.0 parts of a commercially available hard wax (for example VEBA wax J 324 AM, Hoechst wax OM or Carnauba wax), 0.5 part of an α,ω-bis-(trimethylsiloxy)-polydimethylsiloxane of viscosity 440 cs. at 20°C, 5.0 parts of a solution containing 20 percent of methylpolysiloxane resin in organic solvents, 0.5 part of a solution containing 10 percent of di-n-octyl-tin maleate in xylene and 0.8 part of an alkylpolysiloxane as an additive according to the invention, of average composition corresponding to the formula

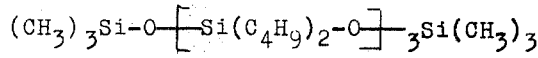

To prepare the polish, the petrol is heated to 80° – 100°C after adding the wax, and when a homogeneous solution has been produced the latter is allowed to cool while stirring well. The remaining components are then mixed in at room temperature.

EXAMPLE 2

A solution of a polish for well-preserved lacquers is prepared from 96 parts of petrol of boiling range 130° – 220°C, 2 parts of a commercially available hard wax, as in Example 1, and 2 parts of a mixture consisting of 30 percent of a silane of the formula $(R''O)_3Si(CH_2)_aNR'''_2$,
wherein
R" denotes an alkyl radical with 1 to 4 C atoms,
R'" denotes hydrogen, alkyl, cycloalkyl or aryl and a denotes a number from 1 to 4,
16% of an α,ω-dihydroxypolydimethylsiloxane of viscosity 1,000 cs. at 20°C, 50 percent of an α,ω-bis-(trimethylsiloxy)-polydimethylsiloxane of viscosity 1,440 cs. at 20°C and 4 percent of 1,3-divinyl-1,1,3,3-tetramethyldisiloxane as an additive according to the invention.

The mixture is prepared as stated in Example 1.

EXAMPLE 3

A solution of a polish for well-preserved lacquers is prepared from 96 parts of petrol of boiling range 130° – 220°C, 2 parts of a commercially available hard wax, as in Example 1, and 2 parts of a mixture consisting of 27.5 percent of tetrabutyl ortho-titanate, 68.5 percent of an α,ω-dihydroxypolydimethylsiloxane of viscosity 1,000 cs. at 20°C and 4.0 percent of a 1,1,1,7,7,7-hexamethyl-3,5-bis(trimethyl-siloxy)-3,5-diphenyl tetrasiloxane of the formula

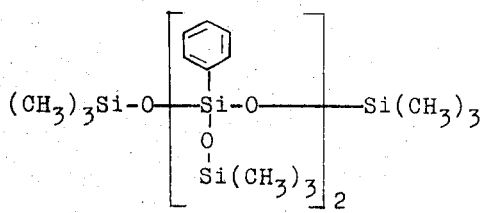

The mixture is prepared as indicated in Example 1.

EXAMPLE 4

An emulsion of a polish, containing abrasive, for weathered lacquers is obtained from 40.0 parts of petrol of boiling range 130° – 220°C, 1,6 parts of olein, 0.4 part of morpholine, 0.2 part of an aralkyl-phenyl-polyglycol ether commercially available as an emulsifier, 19.8 parts of water, 25.0 parts of an aqueous suspension containing 20 percent of wax, 8.0 parts of kieselguhr as an abrasive and 5.0 parts of a titanate-siloxane mixture of the composition shown in Example 3.

To prepare the emulsion the first five components mentioned are vigorously stirred together, the wax emulsion is added while hot, and the emulsion thus obtained is then cooled to room temperature while stirring. The abrasive is then mixed in, followed lastly by the titanate-siloxane mixture.

COMPARISON EXPERIMENTS

A series of pieces of sheet metal coated with a commercially available bodywork lacquer, were used; in each case, one of the polishes obtained according to the examples which have been given was applied to half of one side; the other half was in each case treated with a preparation which did not contain the additive according to the invention but in other respects had the composition shown in the examples. After evaporation of the solvent, the coatings were polished out and it was found that the coating to be compared with Example 1 could not be polished out.

After 24 hours' storage, the metal sheets treated in this way were weathered for one week and then washed with a 3 per cent strength solution of a commercially available detergent containing arylsulphonate, the solution being at 45°C. This weathering and washing treatment was repeated until either the gloss or the hydrophobic character had been reduced to the point that the appearance of the pieces of sheet metal would have required a fresh polishing treatment. The list which follows shows the number of acceptable washing treatments in each case.

| Example | | | Comparison |
|---|---|---|---|
| do. | 1: | 50 | — |
| do. | 2: | 43 | 26 |
| do. | 3: | 40 | 28 |
| do. | 4: | 32 | 18 |

Thus, the resistance to detergents, resistance to finger-marking and gloss retention were substantially longer-lasting in the case of the sheet metal surfaces treated with the polishes according to the invention than in the case of the comparison surfaces.

What we claim is:
1. A polish for glass, stone, plastic, metal, paint and the like, especially for lacquered metal surfaces, comprising, as its base, an organopolysiloxane-wax polishing composition, which polish is improved by an additional content of 2 to 40 per cent by weight, calculated on said composition, of an organosiloxane of the general formula

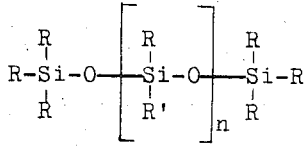

wherein
n is zero or an integer from 1 to 12,
R' is R or —OSiR₃, and
each R is a hydrocarbon radical having up to 18 carbon atoms, individually selected from the group consisting of alkyl, alkenyl and monocyclic aryl, but chosen with the proviso that in said additional organosiloxane of the above formula the numerical ratio of the sum of all carbon atoms to the sum of all silicon atoms is from 4 : 1 to 20 : 1.

2. A polish according to claim 1, wherein the C:Si ratio of said additional organosiloxane is from 4 : 1 to 8 : 1.

3. A polish according to claim 2, wherein the average composition of said additional organosiloxane corresponds to that of 1,1,1,9,9,9-hexamethyl-3,3,5,5,7,7-hexa-n-butyl pentasiloxane.

4. A polish according to claim 2, wherein said additional organosiloxane is 1,3-divinyl-1,1,3,3-tetramethyl disiloxane.

5. A polish according to claim 2, wherein said additional organosiloxane is 1,1,1,7,7,7-hexamethyl-3,5,-bis-(trimethyl-siloxy)-3,5-diphenyl tetrasiloxane.

* * * * *